United States Patent [19]
Clark et al.

[11] Patent Number: 5,315,344
[45] Date of Patent: May 24, 1994

[54] MICROSCOPE CAMERA

[75] Inventors: Peter P. Clark, Acton; Douglas E. Miller, W. Boylston; Deborah A. Mulford, Brookline; John C. Ostrowski, Maynard, all of Mass.

[73] Assignee: Polaroid Corporation, Cambridge, Mass.

[21] Appl. No.: 787,045

[22] Filed: Nov. 4, 1991

Related U.S. Application Data

[63] Continuation of Ser. No. 677,763, Mar. 29, 1991, abandoned.

[51] Int. Cl.$^5$ ............................................. G03B 7/08
[52] U.S. Cl. ...................................... 354/456; 354/79; 354/288; 359/363
[58] Field of Search .............. 354/456, 458, 79, 254, 354/199, 219, 288; 359/363

[56] References Cited

U.S. PATENT DOCUMENTS

| | | | |
|---|---|---|---|
| 3,292,490 | 12/1966 | Moore | 84/79 |
| 3,714,879 | 2/1973 | Land et al. | 354/83 |
| 3,721,170 | 3/1973 | Johnson | 359/363 |
| 3,848,987 | 11/1974 | Novak | 354/254 |
| 3,871,009 | 3/1975 | Steinbatz et al. | 354/79 |
| 3,898,678 | 8/1975 | Walworth | 354/79 |
| 3,900,858 | 8/1975 | McCann et al. | 354/79 |
| 3,967,304 | 6/1976 | Johnson et al. | 354/83 |
| 3,981,021 | 9/1976 | Beecher | 84/79 |
| 4,021,825 | 5/1977 | McCann et al. | 354/79 |
| 4,047,192 | 9/1977 | Johnson et al. | 354/83 |
| 4,051,492 | 9/1977 | Laskin et al. | 354/86 |
| 4,222,646 | 9/1980 | West | 354/79 |
| 4,456,353 | 6/1984 | Mizokami | 354/456 |

*Primary Examiner*—Michael L. Gellner
*Assistant Examiner*—Cassandra C. Spyrou
*Attorney, Agent, or Firm*—John J. Kelleher

[57] ABSTRACT

Photographic apparatus having both automatic and manual modes of operation is adapted for coupling to a microscope. the apparatus includes a viewfinder for viewing a scene in the microscope and an exposure controlling photometer for measuring the scene brightness. In addition, a rotatably mounted disc shutter is provided having an opening therein for generating a photographic image producing exposure interval and having a pair of mirrors supported thereon for movement therewith, for respectively directing image-bearing scene light to the viewfinder and to the photometer prior to an exposure. In the automatic mode, movement of the disc shutter is under the control of a microprocessor whereas in the manual mode, such movement is under operator control.

11 Claims, 6 Drawing Sheets

MICROSCOPE CAMERA

This is a continuation of copending application Ser. No. 07/677,763 filed on Mar. 29, 1991 now abandoned.

BACKGROUND OF THE INVENTION

1. Field of the Invention

The present invention relates to photographic apparatus for an optical instrument, in general, and to the photographic recording in microscopy with such apparatus, in particular.

2. Description of the Prior Art

Well known in the prior art are optical viewing devices such as microscopes, telescopes, binoculars and endoscopes—all instruments useful for their ability to permit visualization of details in objects which would otherwise be too small, distant, dim or inaccessible for the unaided human eye to see. Obtaining permanent photographic records of what the eye sees through such optical viewing devices is an established practice having obvious scientific and artistic benefits. Microscopists, for example, have long valued the advantage and convenience of photographing their specimens using the magnifying power of a microscope.

Several arrangements have been utilized in the prior art to produce a photographic record of an image formed by an optical viewing device. In one such arrangement described in commonly assigned U.S. Pat. No. 4,021,825 to McCann et al., an adapter for operatively coupling a reflex camera having a preprogrammed automatic cycle of operations, to an optical instrument, is disclosed. The adapter, in part, includes mechanisms which permit an operator to selectively modify the preprogrammed cycle of operation for the purpose of making extended time exposures. While extremely effective in coupling such a camera to an optical instrument, it is a relatively complex arrangement and is not as readily adaptable to the optical instrument as it might otherwise be.

In another arrangement described in commonly assigned U.S. Pat. No. 3,721,170 to Johnson, apparatus for operatively coupling a reflex camera with automatic exposure control to a standard monocular microscope, is disclosed. The apparatus contains a microscope eyepiece modified by the insertion therein of a beam splitter. The beam splitter extracts a few percent of the light from the image and reflects it to a mirror. The mirror reflects the extracted light up through a field lens and into the camera's automatic exposure control. A disadvantage of this arrangement is that is reduces the amount of light that is available to produce a photographic image, a problem that is of most concern in low scene light level conditions.

In yet another arrangement such as that described in U.S. Pat. Nos. 3,898,678 and 3,900,858 to Walworth and McCann et al., respectively, there is disclosed other adapters for coupling a camera, with an automatic exposure control, to an optical instrument. These disclosures describe prismatic elements and/or methods for directing a portion of the scene light to the automatic exposure control without diminishing the intensity of light that is available for exposing a film unit. This is accomplished by extracting a portion of the light emerging from the optical instrument, at a separation between the instrument and the camera, otherwise destined to form a unrecorded portion of the image. While this arrangement does not reduce the amount of light actually employed to produce a photographic image it does require manual adjustment of a prism to produce the proper amount of automatic exposure control sensitivity and is necessarily not as sensitive to scene light measurement as an arrangement where all or substantially all of the scene light intensity can be measured.

SUMMARY OF THE INVENTION

In accordance with the teachings of the present invention photographic apparatus having both automatic and manual modes of operation is provided, which is readily adapted for coupling to an optical instrument. The apparatus includes means for viewing and measuring the brightness level of a scene to be photographed. The viewing and measuring means include a movably mounted member having an aperture forming opening therein through which image-bearing light rays emanating from the optical instrument may pass to photosensitive material supported at a film plane within said apparatus to form a focused image thereat and further includes first and second means mounted thereon for movement therewith for respectively directing scene light to said viewing means and to said brightness measuring means. The movably mounted member is moved by drive means coupled thereto under the control of a microprocessor.

The photosensitive material is preferably of the self-developing type and means are provided for processing and ejecting a photographic image of the scene on such material from the apparatus, after exposure is complete.

In the automatic mode of operation the image-bearing scene light is initially directed to a viewfinder by said first means for scene image focusing and/or framing, by an operator. The operator actuated microprocessor subsequently causes said second means to direct scene light to said brightness measuring means, causes said aperture forming opening to move into the path of said image-bearing light rays to generate an exposure interval and thereby produce a photographic image at said film plane, the duration of the exposure interval being dependent upon the measured level of scene brightness, and then causes said photographic image to be processed and ejected from the apparatus.

In the manual mode of operation the image-bearing scene light is also initially directed to the viewfinder by said first means, for scene image focusing and/or framing by an operator. Scene brightness levels are not measured in this mode. The length of time utilized to maintain the aperture forming opening within said scene light path to produce a photographic image and the time of initiation of the processing of the image and its ejection from the apparatus is solely dependent upon operator control.

It is a primary object of the present invention, therefore, to provide photographic apparatus for an optical instrument of substantially reduced complexity than was heretofore available, which is readily adaptable to the optical instrument.

It is another object of the present invention to provide an exposure control system for optical instrument photographic apparatus which measures the light intensity of the entire scene to be photographed and which does not extract any light from the image-bearing light rays during the exposure process.

It is a further object of the present invention to provide optical instrument photographic apparatus having an automatic exposure control system with an extended range of exposure times and having a manual override of the automatic exposure control system for scene light levels which are beyond the range of the automatic exposure control system.

Other objects, features, and/or advantages of the present invention will be readily apparent from the following detailed description of a preferred embodiment thereof when taken in conjunction with the accompanying drawings.

DETAILED DESCRIPTION OF THE PREFERRED EMBODIMENT

Figure 1A:
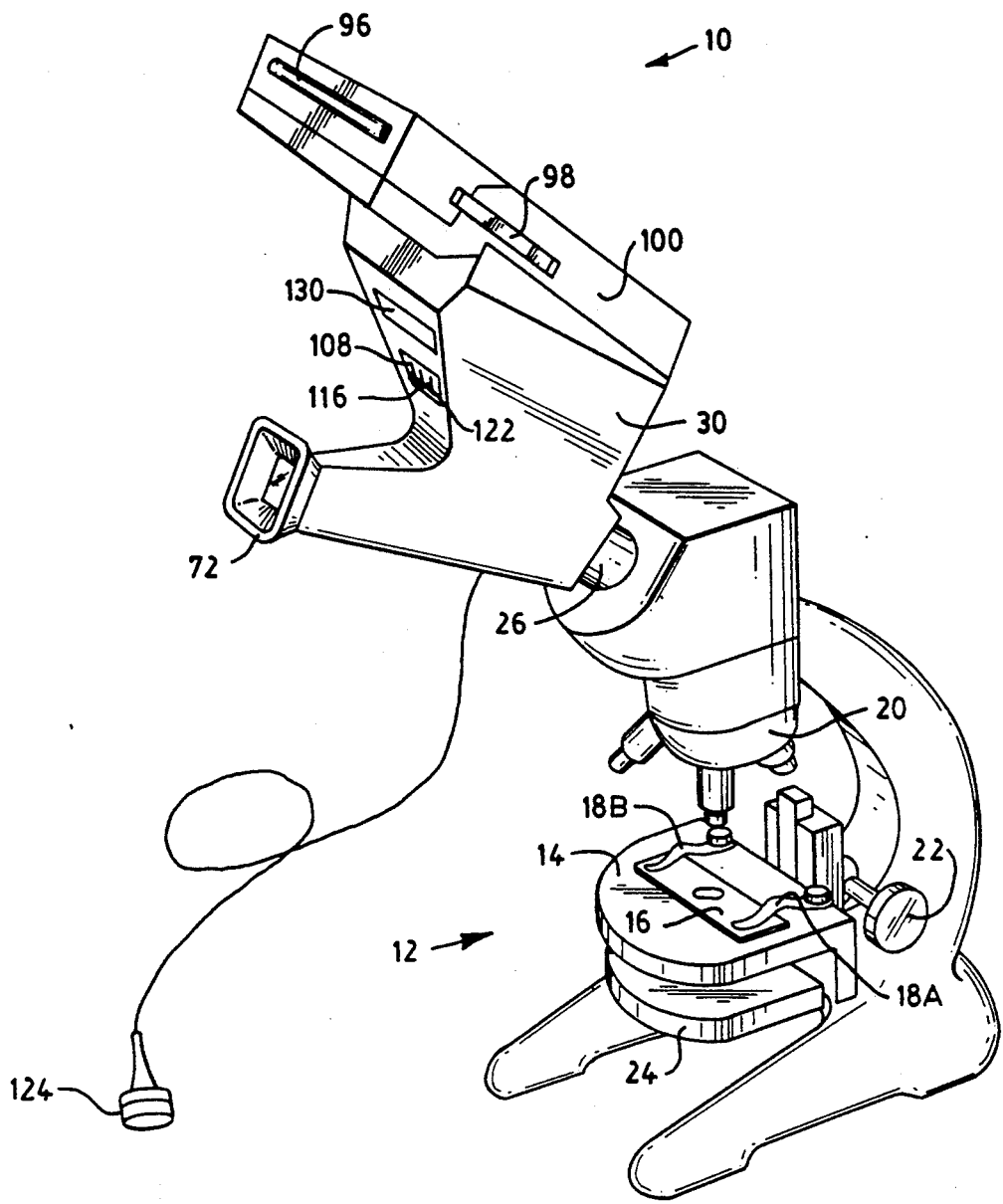
FIG. 1A is a perspective view of the optical microscope photographic apparatus of the present invention shown in its operative position on an optical microscope.
Figure 1B:
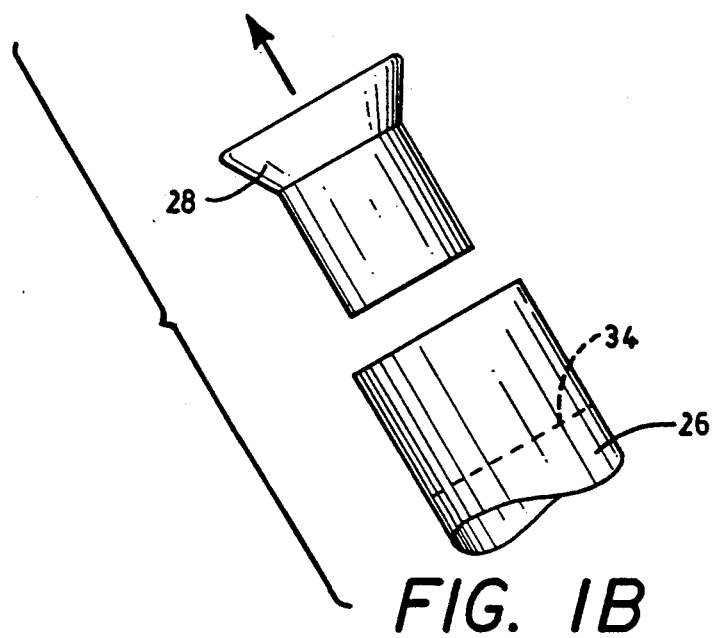
FIG. 1B is a detail of the eyepiece tube of the optical microscope of FIG. 1A showing its eyepiece portion removed therefrom.
Figure 1C:
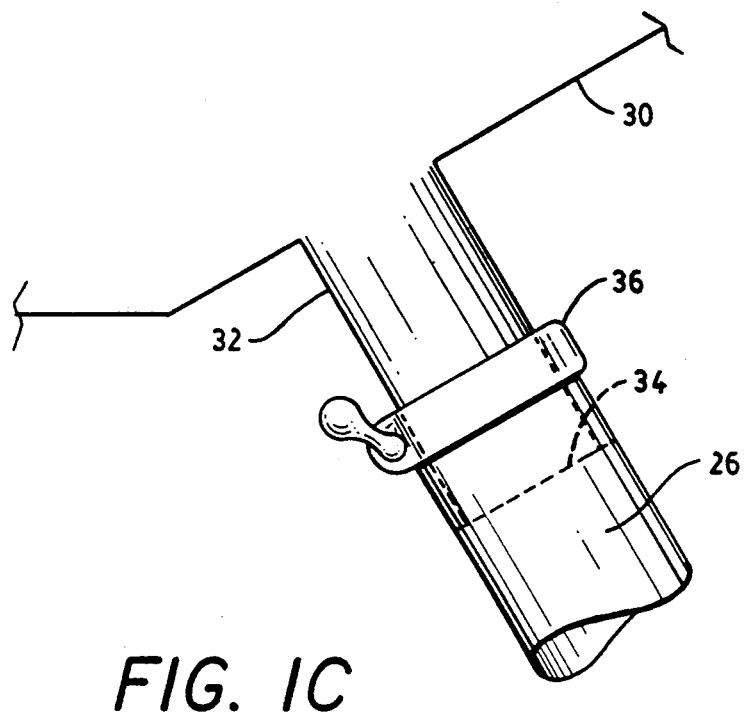
FIG. 1C is a detail of the eyepiece tube of the optical microscope of FIG. 1A showing the image entrance tube of the optical microscope photographic apparatus of the present invention clamped thereto.

Referring now to the drawings, and specifically to FIGS. 1A, 1B and 1C, there is shown optical microscope photographic apparatus 10, incorporating a preferred embodiment of the present invention, operatively coupled to a monocular optical microscope 12. The microscope 12 is of conventional design and includes a support member 14 for supporting a specimen 16 which is clamped thereto by a pair of flexible fingers 18A, 18B.

The specimen 16 is viewable through any of three magnification lenses mounted on a manually rotatable lens turret 20. Focusing of a specimen image viewed through one of these lenses is achieved by manually rotating a focusing knob 22 in either of two directions to thereby cause a change in the magnitude of the distance between the specimen 16 and a magnifying lens on the lens turret 20 and therefore a change in specimen image focus. The specimen 16 is backlighted by a standard microscope light source 24 for viewing and for photographic image forming purposes.

The optical microscope includes an eyepiece tube 26 for supporting an eyepiece 28 through which an operator may view the specimen 16. As best shown in FIG. 1B, the eyepiece 28 is completely removed from the eyepiece tube 26 and the photographic apparatus 10 is attached to the microscope 12 by way of the eyepiece tube 26. The optical microscope photographic apparatus 10 includes a housing 30 having a housing entrance tube 32 projecting outwardly therefrom as best shown in FIG. 1C. The housing entrance tube 32 is inserted into the eyepiece tube 26 until the end thereof engages an eyepiece tube to the housing entrance tube aligning shoulder 34. The shoulder 34 is the same shoulder that supported the end of the previously removed eyepiece 28 mentioned above with respect to FIG. 1B. A manually adjusted opposing jaw clamp 36 then places the entrance tube 32 and therefore the photographic apparatus 10 in a fixed position with respect to the eyepiece tube 26 and its associated microscope 12.

Figure 2:
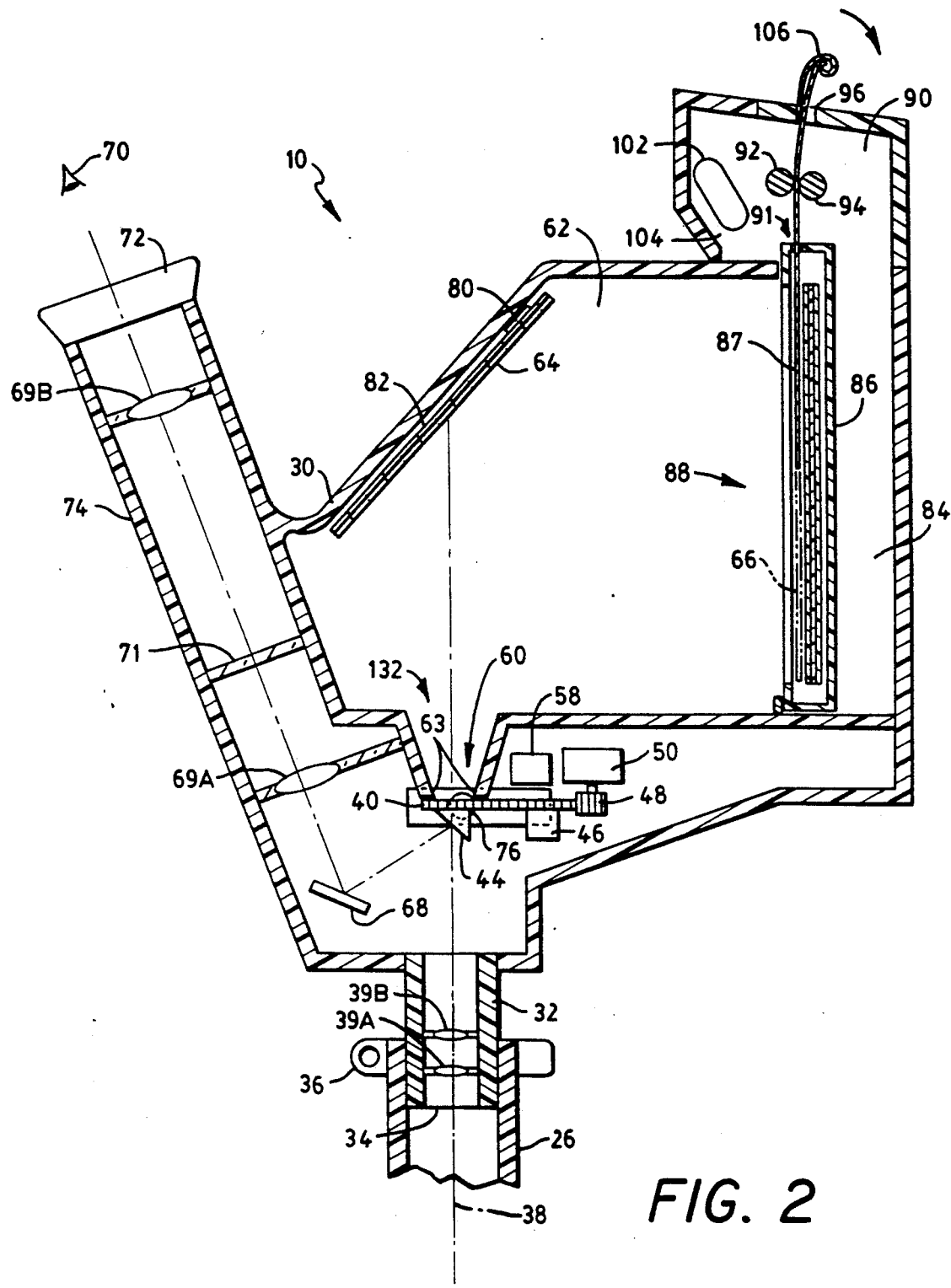
FIG. 2 is an elevational side view, partly in section, of the optical microscope photographic apparatus of the present invention.
Figure 3:
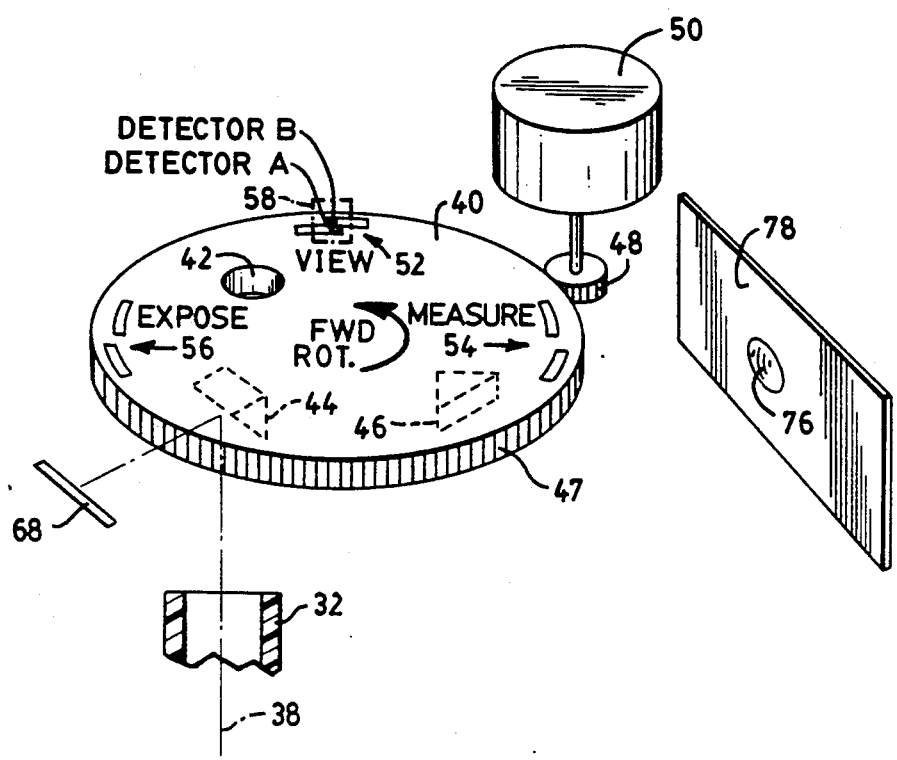
FIG. 3 is an enlarged perspective view of a disc shutter and related components of the optical microscope photographic apparatus of the present invention.

With additional reference to FIGS. 2 and 3, as previously mentioned, the photographic apparatus 10 includes a housing 30 having the housing entrance tube 32 projecting outwardly therefrom. The entrance tube 32 provides an opening in the housing 30 through which image-bearing light rays 38 generated by and emanating from the optical microscope 12, may enter for passage through a pair of image focusing lenses 39A and 39B.

Included within the housing 30 is a rotatably mounted disc shutter 40, best shown in FIG. 3. The disc shutter 40 has an opening 42 therein. In addition, first and second means comprising, respectively, a viewing mirror 44 and a photometer mirror 46 are attached, in a fixed relation, to a bottom surface of the disc shutter 40, for movement therewith. The periphery of the disc shutter 40 is in the form of a ring gear 47 which is in a meshing relationship with a pinion gear 48 which is driven by a microprocessor controlled stepper motor 50. The stepper motor 50 is capable of driving the disc shutter opening 42, the viewing mirror 44 and the photometer mirror 46 through and/or into the path of the image-bearing light rays 38.

The disc shutter 40 is provided with an encoding system in order to determine the direction of disc shutter movement and to determine disc shutter position. The encoding system comprises three pairs of curved and reflective stripes 52, 54 and 56. The ends of the reflective pair of stripes 52 circumferentially overlap one another whereas the ends of the reflective pair of stripes 54 and 56 are in a circumferentially spaced relation. In addition, each of the reflective stripes in stripe pair 54 are in the opposite position relative to the periphery of the disc shutter 40, with respect to the reflective stripes in stripe pair 56. A source of light (not shown) and light detectors A and B are located within a sensor 58. Each of these detectors are turned on if they should sense a reflection of light, generated by the sensor light source, from an adjacent reflective stripe. The light source, light detector and reflective stripe encoding system generates movement and position information of the opening 42 in the disc shutter 40 with respect to the image bearing light rays 38 emanating from the optical microscope 12 and entering the housing entrance tube 32. This disc shutter opening 42 related information is derived in accordance with the following table:

| SENSORS | | DISC | |
|---|---|---|---|
| A | B | ROT | STATE |
| ON | OFF | FWD | Appr View or Measure |
| OFF | ON | REV | " |
| ON | OFF | REV | Appr Expose |
| OFF | ON | FWD | " |
| ON | ON | — | @ View |
| OFF | OFF | — | @ Measure or Expose |

Image bearing light rays 38 emanating from the optical microscope 12 and entering the housing entrance tube 32 where they are focused by the focusing lenses 39A and 39B, enter an opening 60 in an exposure chamber 62 within the housing 30 when the microprocessor controlled stepper motor overlaps or aligns the opening 42 in the disc shutter 40 with the exposure chamber opening 60. When openings 42 and 60 are not in an overlapping relation, a conventional lightseal 63 prevents light from entering the exposure chamber 62 through the opening 60. These focused image-bearing light rays are, in turn, reflected from a mirror 64 within the chamber 62 to a film plane 66 and to photosensitive material located thereat.

As noted above, viewing mirror 44 and photometer mirror 46 are mounted, in a fixed position, on the disc shutter 40. In addition to driving the disc shutter opening 42 into an overlapping relation with the exposure chamber opening 60 and with the image-bearing light rays 38, the stepper motor 50 can also position the viewing mirror 44 and the photometer mirror 46 into the path of the image-bearing light rays 38. When the movably mounted viewing mirror 44 on the disc shutter 40 is positioned into the path of the image-bearing light rays 38 by the stepper motor 50, the light rays are reflected onto a stationary viewing mirror 68, through a pair of focusing lenses 69A and 69B and a reticle 71 and then into an eye 70 of a microscope operator through an eyepiece 72 at the outer end of a photographic apparatus viewing tube 74. When the movably mounted photometer mirror 46 on the disc shutter 40 is positioned in the path of the image-bearing light rays 38 by the stepper motor 50, the light rays are reflected onto a photosensitive element 76 of a photometer 78. In this position of the photometer mirror 46, the photometer 78 measures the scene light intensity of the image bearing light rays 38. The magnitude of the measured scene light intensity is then routed to a microprocessor 80 mounted on a printed circuit board 82, for storage therein, for subsequent use in controlling the amount of image-bearing scene light transmitted to photosensitive material located at the film plane 66.

In the illustrated embodiment, optical microscope photographic apparatus 10 is of the self-developing type for exposing and processing integral self-developing snapshot size film units. Representative examples of such self-developing film units are disclosed in commonly assigned U.S. Pat. Nos. 3,415,664; 3,594,165 and 3,761,268. These film units are generally supplied in a cassette or film container which also includes a flat battery, underlying a stack of film units, for powering the electrical system of the photographic apparatus in which it is employed. For representative examples of such cassettes see commonly assigned U.S. Pat. Nos. 3,779,770 and 3,948,662.

The housing 30 of the photographic apparatus 10 includes a chamber 84 for receiving and supporting a film cassette 86 so that a forwardmost one 87 of a stack of film units 88 within the cassette 86 is located at the film plane 66. The cassette chamber 84 includes an upper portion 90 for pivotal motion relative to the chamber 84 between its closed operative position (as shown) wherein it supports a pair of laterally extending pressure applying rollers 92 and 94 between a film withdrawal slot 91 at a leading end of the cassette 86 and a film exit opening 96 in a wall of the upper chamber portion 90, and an inoperative position (not shown). The inoperative position is where the upper portion 90 of the chamber 84 is pivoted in a clockwise direction (as viewed in FIG. 2) to provide access to an open end of the cassette chamber 84 through which the film cassette 86 is moved to insert it into or withdraw it from the cassette chamber 84. Upper cassette chamber portion 90 is releasably held in its closed position by a latch mechanism (not shown) which is released by manually actuating a latch release member 98, slidably mounted on a side wall 100 of the photographic apparatus 10 as shown in FIG. 1A.

The left roller 92 (as viewed in FIG. 2) is adapted to be rotatably driven by a small DC electrical motor 102 mounted within the housing 30, adjacent the upper cassette chamber portion 90, and coupled to the roller 92 through an elongated gear train (not shown). A well or recess 104 is provided within the housing 30 to accommodate the electrical motor 104.

At the trailing end of the elongated gear train is a film advancing mechanism or pick (not shown) that extends into a slot at the trailing end of the cassette 86 and engages the rear edge of the forwardmost film unit 87. The pick is advanced forwardly by a pick drive cam or pin on one of the gears in the train when it rotates in response to being driven by the motor 102. The forward motion of the pick advances the forwardmost film unit 87 through the film withdrawal slot 91 in the leading end of the cassette 86 and feeds the leading end of the film unit into the bite of the pressure-applying rollers 92 and 94.

Following exposure of the forwardmost film unit 87 the motor 102 is energized, preferably by the flat battery in the cassette 86, and the film unit is advanced by the pick into engagement with the rollers 92 and 94. Roller 92 is rotated in a counterclockwise direction to advance the film unit 87 between the pressure-applying rollers and along a film exit path extending through the film exit opening 96 to the exterior of the photographic apparatus 10.

The rollers 92 and 94 apply a compressive pressure to the film unit 87 as it is advanced therebetween for rupturing a pod at the leading end of the film unit and releasing therefrom an opaque liquid processing composition which is distributed between predetermined layers of the film unit to initiate a well-known development and diffusion transfer process. In the illustrated embodiment, as the film unit 87 is advanced through the exit opening 96, it engages and uncoils a light opaque and resilient coil of plastic sheet material 106 that protectively and progressively covers the emerging film unit to block the passage of ambient light rearwardly along transparent layers of the film unit to thereby protect the photosensitive portion of the film unit behind the rollers 92 and 94, which portion has not been covered with the processing liquid, from becoming prematurely exposed or fogged.

The components and systems in cassette chamber 84 and upper cassette chamber portion 90 for supporting the film units 88, supplied in the cassette 86, at the film plane 66 of the photographic apparatus 10 for exposure, and for processing and ejecting the film unit therefrom following exposure are all well-known in the prior art and need not be described further herein to understand the present invention. Virtually the same arrangement is employed in a commercially available camera back Model CB-72 sold by Polaroid Corporation, Cambridge, Mass. 02139. Additional representative examples of such components and systems suitable for use in the photograph apparatus 10 are disclosed in commonly-assigned U.S. Pat. Nos. 3,714,879; 3,967,304; 4,047,192; and 4,051,492, all of which are incorporated herein by reference.

OPERATION

Figure 4:
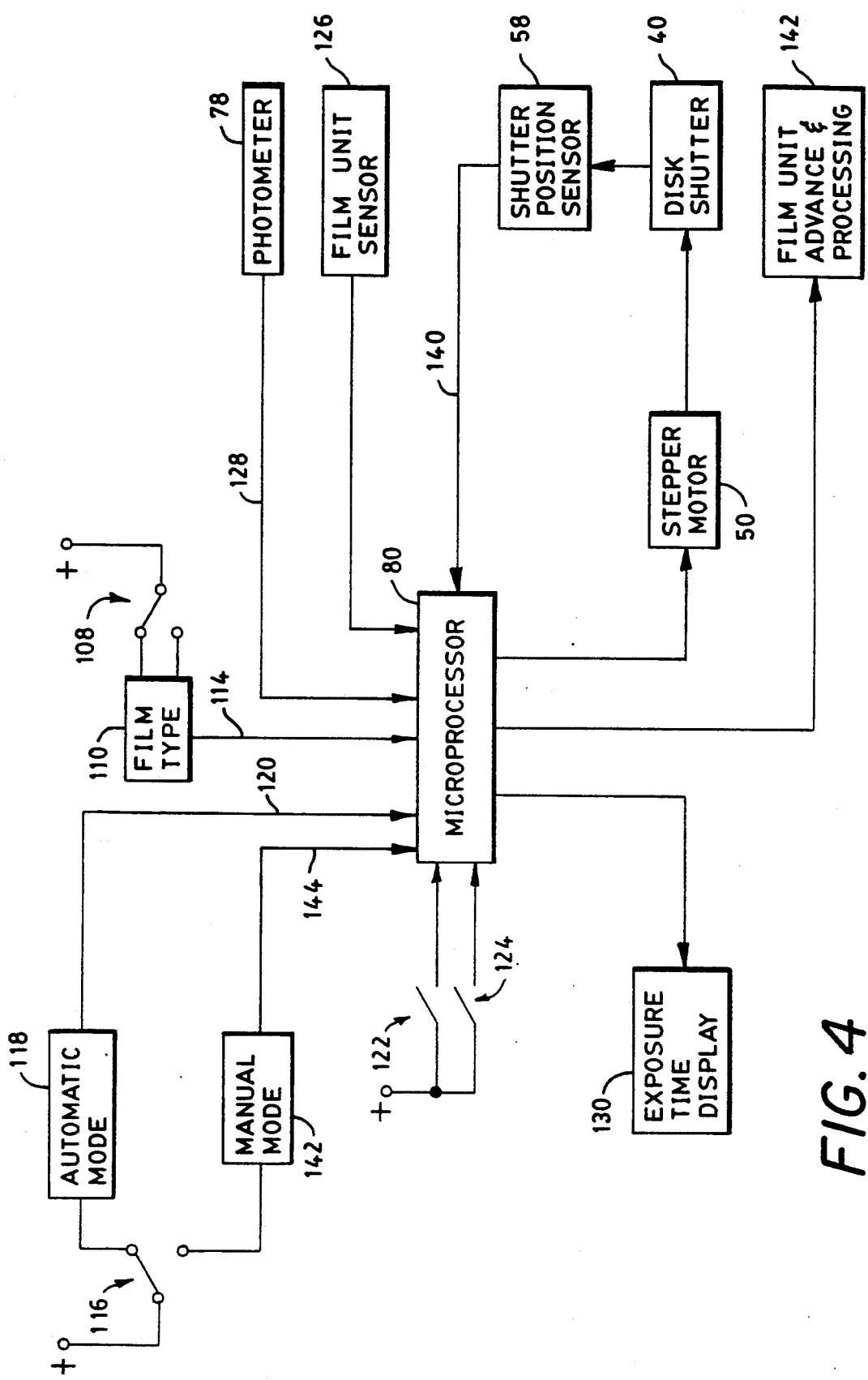
FIG. 4 is a functional block diagram of the control system of the photographic apparatus of the present invention.
Figure 5:
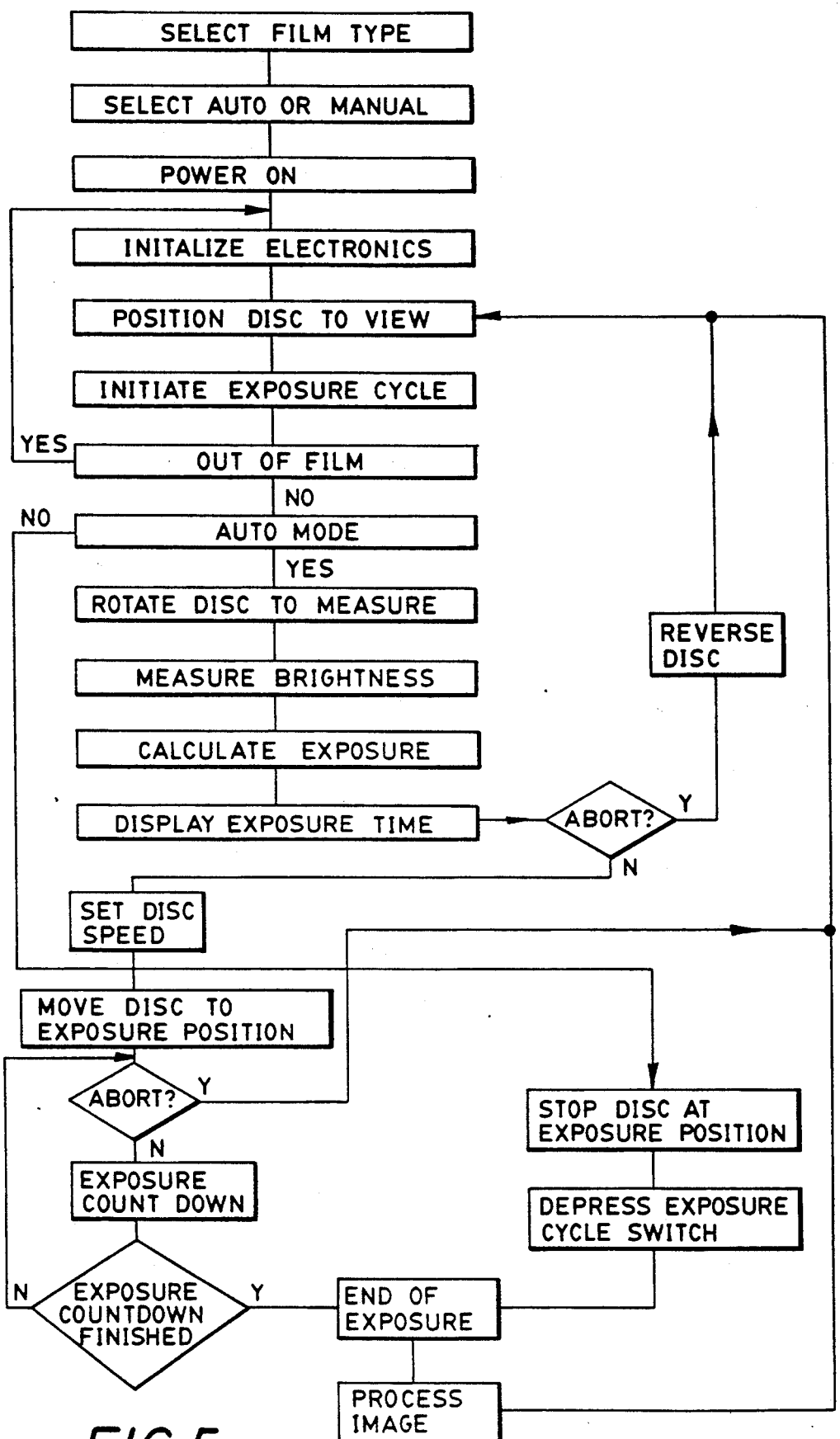
FIG. 5 is a logic sequence diagram of the operation of the control system for the automatic and manual control of the photographic apparatus of the present invention.

The operation of the photographic apparatus 10 in conjunction with the optical microscope 12 will now be described in detail. It is assumed that a full film cassette 86 has been inserted into the photographic apparatus 10 and that the film unit 87 is supported at the film plane 66 thereof in the previously described manner. With additional reference to FIGS. 4 and 5, a film-type select switch 108 on the front face of the photographic apparatus 10 is manually placed in a position prescribed by the type of film enclosed within the film cassette 86. A signal 110 representative of the type of film selected is routed to the microprocessor 80 through a path 114, for storage therein. In addition, an automatic/manual mode select switch 116 is placed in the automatic control mode. A signal 118 representative of the automatic mode being selected is routed to the microprocessor 80 through a path 120.

A power control switch 122 is manually actuated to its ON position to thereby couple the flat battery or DC power source within the cassette 86 to various electrical components within the photographic apparatus 10 including the microprocessor 80. When the power switch 122 is placed on its ON position, the control system electronics and the exposure control system are initialized, with the microprocessor 80 causing the stepper motor 50 to position the viewing mirror 44 on the disc shutter 40 into the path of the image-bearing light rays 38 for viewing by an operator through the eyepiece 72. The operator can frame and focus an image of the specimen 16 being viewed through the eyepiece 72 by the lateral movement of the specimen 16 relative to the flexible fingers 18A, 18B, or by rotating the focusing knob 22, respectively.

When framing and focusing are complete, an operator momentarily depresses a remote, exposure cycle initiation switch 124 to its ON position to initiate an exposure cycle. Depressing the switch 124 in this manner causes the microprocessor 80 to interrogate a film unit sensor 126 to insure that a film unit is present at the film plane 66. After it is determined that a film unit is so present, the microprocessor 80 determines if the control system is in its automatic mode of operation. Having determined that the automatic control mode has been selected, the microprocessor 80 actuates the stepper motor 50 such that it then positions the photometer mirror 46 into the path of the image-bearing light rays 38. When the photometer mirror 46 is in this position, the light intensity of the image-bearing light rays 38 is measured by the photometer 78 in the previously described manner.

The magnitude of the intensity of the image-bearing scene light measured by the photometer 78 is routed to the microprocessor 80 on a path 128. The microprocessor 80 then calculates the required amount of exposure time, which is then displayed on a liquid crystal display LCD 130 located above the eyepiece 72 on an external surface of the photographic apparatus 10. The microprocessor 80 also corrects for reciprocity failure of the film units in the cassette 86. Reciprocity is a characteristic of photographic material wherein for greater scene light intensities shorter exposure times are required. However, as the required amount of exposure time increases, more than the required amount of exposure time must occur in order to produce a proper exposure. In other words, what was a linear relationship has turned into a non-linear one. This phenomenon is normally referred to as reciprocity failure. Reciprocity failure correction is accomplished with a look-up table (not shown) included within the microprocessor 80. The film type signal 110 previously applied to the microprocessor 80 is combined with the signal representative of the intensity of the image-bearing light rays 38 in the look-up table and an exposure time that includes any additional time required for reciprocity failure correction, is displayed on the LCD display 130 as previously explained. It should be noted that there is a different look-up table for each different film type. It should also be noted that the exposure cycle can be aborted at this point in the exposure cycle without exposing a film unit by depressing the exposure cycle initiation switch 124 for the second time which will cause the stepper motor 50 to reverse the disc 40 to its viewing position.

Upon completion of the exposure time calculations, the microprocessor 80 causes the stepper motor 50 to rotate the disc shutter 40 to the exposure position where an aperture 132 is formed by the circular opening 42 in disc shutter 40 and the circular opening 60 in the exposure chamber 62 as shown in FIG. 2. The aperture 132 is formed in the path of the image-bearing light rays 38 thereby enabling an image of the specimen 16, for example, to be formed on the film unit 87 at the film plane 66 in the previously described manner.

As the opening 42 of the disc shutter 40 is being rotated toward the exposure position by the stepper motor 50, prior to the formation of the aperture 132, movement of the disc shutter 40 is sensed by the detectors A and B (FIG. 3) within the sensor 58 and signals representative of such movement are transmitted to the microprocessor 80 through a path 140 where the state of the disc shutter 40 is interpreted in accordance with the above table. If the microprocessor 80 determines that the disc shutter 40 is moving in the proper direction toward the exposure position, it will cause the stepper motor 50 to move the opening 42 of the disc shutter 40 into the path of the image-bearing light rays 38 for a period of time that will produce the required exposure time interval in accordance with the intensity of light in said image-bearing light rays 38 as previously measured by the photometer 78. If the operator aborts the exposure cycle during an exposure interval, the exposure interval is immediately terminated and then film unit advancing and processing is initiated. An abort at this time will most likely produce an improperly exposed film unit. When the disc shutter 40 is moved into its exposure position, a countdown of the exposure time shown on the LCD is initiated. At the end of the exposure interval the microprocessor 80 causes the exposed self-developing film unit 87 to be advanced into the spread rollers 92 and 94 and out through the film exit opening 96 in the previously described manner as functionally represented by film unit advance and processing 142 in FIG. 4. The microprocessor 80 then causes the disc shutter 40 to be rotated to its specimen viewing position.

In addition to the just-described automatic mode of operation, the photographic apparatus 10 also includes a manual mode of operation. The manual mode is selected by placing the mode select switch 116 in its manual mode position which causes a manual mode select signal 142 to be transmitted to the microprocessor 80 through a path 144. The microprocessor controlled stepper motor 50 will cause the disc shutter 40 to move to the view position when the power control switch 122 is turned ON. The microprocessor controlled motor 50 will cause the disc shutter 40 to move to its expose position when the exposure cycle initiation switch 124 is then momentarily depressed.

In the preferred embodiment, in the manual exposure control mode, a circular aperture is formed in the path of the image-bearing light rays 38 by the circular opening 42 in the disc shutter 40 and the circular opening 60 in the exposure chamber 62 when the disc shutter 40 is in its exposure position. In the manual exposure control mode an exposure interval is terminated by the operator depressing the exposure cycle initiation switch 124 one additional time. As in the automatic exposure control mode, at the end of the manually controlled exposure interval, the microprocessor 80 causes the exposed self-developing film unit 87 to be advanced into the spread rollers 92 and 94 and out through the film unit exit opening 96. The microprocessor 80 then causes the disc shutter 40 to be moved to its specimen viewing position.

From the foregoing description of the invention it will be apparent to those skilled in the art that various improvements and modifications can be made in it without departing from its true scope. The embodiments described herein are merely illustrative and should not be viewed as the only embodiments that might encompass the invention.

What is claimed:

1. Photographic apparatus comprising:
   means for coupling said apparatus to an optical instrument;
   a housing having a first opening therein through which image-bearing light rays emanating from the optical instrument may be directed to photosensitive material supported at a film plane within said housing to form a focused image thereat;
   means for focusing said image bearing light rays at said film plane;
   a viewfinder for viewing a scene in the optical instrument;
   a photometer for measuring the brightness of the scene and for generating a signal representative thereof;
   energizable exposure control means including a movably mounted member having a second opening therein situated for overlapping movement with respect to said first opening to collectively form an exposure aperture where it allows the passage of the image-bearing light rays from the optical instrument to said film plane during an exposure interval;
   first means mounted on said movably mounted member, for movement therewith, for directing scene light to said viewfinder;
   second means mounted on said movably mounted member, for movement therewith, for directing scene light to said photometer;
   drive means coupled to said movably mounted member for moving 1) said second opening 2) said first means and 3) said second means, through the path of said image bearing light rays; and
   control means for actuating said drive means to position one of said first and second means in the path of said image-bearing light rays and then the other of said first and second means into the path of said image-bearing light rays for scene viewing or for scene brightness measurement, and then move said second opening into the path of the image-bearing light rays, for a period of time that is dependent upon the magnitude of said image brightness signal, to produce the exposure interval with said exposure aperture and thereby cause the scene to be reproduced in the photosensitive material present at said film plane.

2. The photographic apparatus of claim 1 wherein said control means operates in a predetermined sequence of steps, said control means includes means for generating an exposure control means initialization signal and an exposure control means initiation signal for initiating said sequence of steps and said exposure control means is responsive to said exposure control initialization and initiation signals.

3. The photographic apparatus of claim 2 wherein said exposure control means initialization signal is generated in response to the energization of said energizable exposure control means and said exposure control means initiation signal is manually generated by a photographic apparatus operator subsequent to the generation of said exposure control means initialization signal.

4. The photographic apparatus of claim 2 further comprising means for manually generating a signal for altering said exposure control means predetermined sequence of steps and said control means is responsive to said sequence of steps altering signal to alter the predetermined sequence of steps of said exposure control means.

5. The photographic apparatus of claim 4 wherein said control means includes means for returning said exposure control means to a previous condition without generating an exposure interval if said first and second openings have not formed said exposure aperture and for terminating the exposure interval and thereby cause the scene to be partially reproduced in said photosensitive material if said first and second opening have form said exposure aperture.

6. The photographic apparatus of claim 1 wherein each of said first and second means comprises a reflective mirror for reflecting scene light to said viewfinder and to said photometer, respectively.

7. The photographic apparatus of claim 1 wherein said drive means includes an electrical stepper motor.

8. The photographic apparatus of claim 7 wherein said control means includes a microprocessor for generating a plurality of stepper motor drive signals and said stepper motor rotates said movably mounted member in response to said microprocessor generated drive signals.

9. The photographic apparatus of claim 1 wherein the optical instrument is a microscope having an eyepiece tube for supporting a specimen viewing optical eyepiece, said housing includes a housing entrance tube for attachment, in a fixed relation, to the eyepiece tube such that image-bearing light rays emanating from the microscope may be directed to said film plane and to photosensitive material supported thereat.

10. The photographic apparatus of claim 1 wherein said energizable exposure control means includes both automatic and manual modes of operation said control means includes means selecting one or the other of said exposure control modes, means for manually generating an exposure control signal, and said energizable exposure control means is responsive to said manually generated exposure control signal when said energizable exposure control means is in its said manual exposure control mode of operation.

11. A method of photographing a scene in an optical microscope with photographic apparatus comprising the steps of:

coupling the apparatus to the optical microscope;

forming a housing having a first opening therein through which image-bearing light rays emanating from the optical microscope may be directed to photosensitive material supported at a film plane within the housing;

forming a viewfinder for viewing the scene in the optical microscope;

providing a photometer for measuring the brightness of the scene and for generating a signal representative thereof;

forming exposure control means including a movably mounted member having a second opening therein situated for overlapping movement with respect to said first opening to collectively form an exposure aperture where it allows the passage of image-bearing light rays from the optical microscope to said film plane during an exposure interval;

mounting first means on said movably mounted member, for movement therewith, for directing scene light to said viewfinder;

mounting second means on said movably mounted member, for movement therewith, for directing scene light to said photometer;

coupling drive means to said movably mounted member for moving 1) said second opening 2) said first means and 3) said second means, through the path of said image bearing light rays; and actuating said drive means to position one of said first and second means in the path of said image-bearing light rays and then the other of said first and second means into the path of said image-bearing light rays for scene viewing or for scene brightness measurement, and then move said second opening into the path of the image-bearing light rays, for a period of time that is dependent upon the magnitude of said image brightness signal, to produce the exposure interval with said exposure aperture and thereby cause the scene to be reproduced in the photosensitive material present at the film plane.

* * * * *